US008570580B2

(12) United States Patent
Tachibana (10) Patent No.: US 8,570,580 B2
(45) Date of Patent: Oct. 29, 2013

(54) PRINTING SYSTEM, PRINTING APPARATUS, PRINTING METHOD, CONTROL METHOD AND COMPUTER-READABLE MEDIUM RELATE TO A TECHNIQUE THAT GIVES A PRINTING INSTRUCTION TO A PRINTING SYSTEM IN WHICH A PLURALITY OF PRINTING APPARATUSES ARE SERIES-CONNECTED PHYSICALLY AND GENERATES ONE PRINTED PRODUCT ON ONE PRINTING MEDIUM

(75) Inventor: Yoshiro Tachibana, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 13/302,959

(22) Filed: Nov. 22, 2011

(65) Prior Publication Data

US 2012/0154855 A1    Jun. 21, 2012

(30) Foreign Application Priority Data

Dec. 17, 2010   (JP) ................................ 2010-282399

(51) Int. Cl.
*G06K 15/00* (2006.01)
*G06K 15/22* (2006.01)
*G06F 3/12* (2006.01)
*H04N 1/60* (2006.01)
*G03G 15/20* (2006.01)
*G03G 15/00* (2006.01)

(52) U.S. Cl.
USPC ........... 358/1.15; 358/1.12; 358/1.4; 358/1.9; 399/309; 399/364; 399/392; 399/393; 399/405

(58) Field of Classification Search
USPC ............... 358/1.15, 1.12, 1.13, 1.4, 1.9, 296; 399/2, 298, 302, 308, 304, 384, 299, 399/364, 375, 16, 124, 110, 107, 402, 391, 399/405, 388, 381, 392, 195, 272, 279, 294, 399/300, 307, 309, 312, 361, 363, 365, 374, 399/393; 355/24, 26, 14, 23, 77, 407; 271/185, 186, 65, 184, 255, 3.14, 4.01, 271/9.01, 298, 303, 3.19, 289, 3.24, 6, 4.06
See application file for complete search history.

(56) References Cited

U.S. PATENT DOCUMENTS

| 6,476,923 | B1 * | 11/2002 | Cornell ........................ 358/1.12 |
| 7,957,667 | B2 * | 6/2011 | Otsuka et al. ................. 399/107 |
| 7,991,346 | B2 * | 8/2011 | Kida et al. .................... 399/405 |
| 2010/0098450 | A1 * | 4/2010 | Nakazawa ....................... 399/82 |

FOREIGN PATENT DOCUMENTS

JP    2007-21759 A    2/2007

* cited by examiner

*Primary Examiner* — Ngon Nguyen
(74) *Attorney, Agent, or Firm* — Fitzpatrick, Cella, Harper & Scinto (57) ABSTRACT

A printing apparatus comprises: an acquisition unit configured to analyze an input print job and acquires information of a sheet to be used in printing; and a printing unit configured to print the input print job by performing paper feed from an inserter controlled by another connected printing apparatus, if the information acquired by the acquisition unit indicates that a sheet to be used in printing is stored in a manual insertion paper feed unit.

5 Claims, 6 Drawing Sheets

PRINT JOB INPUT FROM PC TO PRINTING APPARATUS B

JOB ATTRIBUTE DEFINITION PORTION
JOB ID = 0001
FIRST PHYSICAL PAGE : PAPER FEED UNIT = CASSETTE 1
/PAPER SIZE = A3/PAPER TYPE = PLAIN PAPER
SECOND PHYSICAL PAGE : PAPER FEED UNIT = MANUAL INSERTION
/PAPER SIZE = A3/PAPER TYPE = THICK PAPER

DRAWING INFORMATION DEFINITION PORTION
DRAWING OF FIRST LOGICAL PAGE : DRAW RED
/RECTANGLE/DRAW CLEAR IMAGE ON ENTIRE SHEET SURFACE
DRAWING OF SECOND LOGICAL PAGE : DRAW BLACK/CIRCLE
/DRAW CIRCULAR CLEAR IMAGE

PRINTING SYSTEM, PRINTING APPARATUS, PRINTING METHOD, CONTROL METHOD AND COMPUTER-READABLE MEDIUM RELATE TO A TECHNIQUE THAT GIVES A PRINTING INSTRUCTION TO A PRINTING SYSTEM IN WHICH A PLURALITY OF PRINTING APPARATUSES ARE SERIES-CONNECTED PHYSICALLY AND GENERATES ONE PRINTED PRODUCT ON ONE PRINTING MEDIUM

BACKGROUND OF THE INVENTION

1. Field of the Invention

The present invention relates to a technique that gives a printing instruction to a printing system in which a plurality of printing apparatuses are series-connected physically (this arrangement will be called tandem-connected printing apparatuses hereinafter), and generates one printed product on one printing medium (the generation of this printed product will be called tandem printing hereinafter).

2. Description of the Related Art

Recently, a spot color expressing a color that cannot be expressed by the process colors or a transparent for giving gloss is often used on the printed product to provide added value to a printed product generated by combining process colors such as CMYK. However, these spot color and transparent can be processed by only a special printing apparatus in most cases. Therefore, printing (to be referred to as added-value printing hereinafter) given an added value is implemented by combining printing apparatuses for performing process color printing, spot color printing, and printing with the transparent toner.

For example, the implementation of added-value printing combining process color printing that performs printing by using CMYK toner or the like and printing with the transparent toner will be explained below. Two printing apparatuses are physically connected in series, and process color printing is performed using the front printing apparatus. After that, the rear printing apparatus performs printing with the transparent toner on the printed product generated by the front printing apparatus. In this printing, the user inputs a print job to the tandem-connected printing apparatuses. On the other hand, a user who does not perform printing with the transparent toner or a user who is satisfied with the image quality of a printed product generated by performing process color printing and printing with the transparent toner by a single printing apparatus inputs a print job to the rear printing apparatus. Thus, the arrangement in which two printing apparatuses each operating as a single printing apparatus as well are tandem-connected can construct printing systems meeting various demands of users.

In the tandem-connected printing apparatuses as described above, a manual insertion paper feed port of the rear printing apparatus is sometimes used as a path to convey a printing medium (a paper sheet or the like) from the front printing apparatus to the rear printing apparatus. In this arrangement, the front printing apparatus closes the manual insertion paper feed port of the rear printing apparatus. This poses the problem that when using the rear printing apparatus as a single printing apparatus, a printing medium having a large grammage such as thick paper or coated paper that can be fed from the manual insertion paper feed unit cannot be fed to the rear printing apparatus.

As a method for avoiding this problem, it is possible to feed a printing medium having a large grammage such as thick paper or coated paper by using a manual insertion paper feed unit of the front printing apparatus. However, this method poses another problem that a fixing portion of the front printing apparatus deteriorates because the printing medium passes through the fixing portion. Furthermore, the printing medium passes through the fixing portions of both the front and rear printing apparatuses. This may give damage to the printing medium, and may make it impossible to obtain a printed product desired by the user.

To solve the above problem, there is a prior art of a printing apparatus including a second conveying path for feeding a continuous sheet fed from a paper feed side toward a paper discharge side by avoiding an image formation unit (fixing portion), in addition to a first conveying path for feeding a continuous sheet having undergone image formation toward to the paper discharge side (Japanese Patent Laid-Open No. 2007-21759).

Unfortunately, the prior art as described above has the problem that the second conveying path that is not used when the printing apparatus operates as a single printing apparatus must be preformed in the printing apparatus, and this unavoidably increases the cost of the printing apparatus.

Also, when inputting a print job to the rear printing apparatus, the user must generate the print job by considering that the manual insertion paper feed unit is physically unusable. When generating a print job, therefore, the user must generate the job by assuming a printing apparatus to which the print job is to be input. This imposes a large burden on the user.

SUMMARY OF THE INVENTION

The present invention has been made in consideration of the problems as described above, and provides a printing system in which an inserter used as a post-processing apparatus of a front printing apparatus is usable as a substitute for a manual insertion paper feed unit of a rear printing apparatus.

According to one aspect of the present invention, there is provided a printing system in which a paper feed unit of a second printing apparatus is connected to a paper discharge unit of a first printing apparatus, a sheet conveyed from the paper discharge unit of the first printing apparatus is fed to the paper feed unit of the second printing apparatus, and the second printing apparatus performs printing on the sheet, the first printing apparatus comprising an inserter configured to be connected to the paper feed unit of the second printing apparatus, and to feed a held sheet to one of the first printing apparatus and the second printing apparatus, and a first control unit configured to control paper feed from the inserter to the paper feed unit of the second printing apparatus, and the second printing apparatus comprising a second control unit configured to transmit, to the first control unit, control information for controlling paper feed from the inserter, wherein the second control unit determines whether a received print job contains an instruction designating manual insertion paper feed, and, if it is determined that the received print job contains an instruction designating manual insertion paper feed, transmits, to the first control unit, the control information requesting paper feed from the inserter.

According to another aspect of the present invention, there is provided a printing apparatus comprising: an acquisition unit configured to analyze an input print job and acquires information of a sheet to be used in printing; and a printing unit configured to print the input print job by performing paper feed from an inserter controlled by another connected printing apparatus, if the information acquired by the acquisition unit indicates that a sheet to be used in printing is stored in a manual insertion paper feed unit.

According to another aspect of the present invention, there is provided a printing method of a printing system in which a paper feed unit of a second printing apparatus is connected to a paper discharge unit of a first printing apparatus, a sheet conveyed from the paper discharge unit of the first printing apparatus is fed to the paper feed unit of the second printing apparatus, and the second printing apparatus performs printing on the sheet, the first printing apparatus comprising an inserter configured to be connected to the paper feed unit of the second printing apparatus, and to feed a held sheet to one of the first printing apparatus and the second printing apparatus, the method comprising: a first control step of causing a first control unit to control paper feed from the inserter to the paper feed unit of the second printing apparatus, in the first printing apparatus; and a second control step of causing a second control unit to transmit, to the first control unit, control information for controlling paper feed from the inserter, in the second printing apparatus, wherein in the second control step, whether a received print job contains an instruction designating manual insertion paper feed is determined, and, if it is determined that the received print job contains an instruction designating manual insertion paper feed, the control information requesting paper feed from the inserter is transmitted to the first control unit.

According to another aspect of the present invention, there is provided a control method of a printing apparatus, comprising: an acquisition step of causing an acquisition unit to analyze an input print job and acquire information of a sheet to be used in printing; and a printing step of causing a printing unit to print the input print job by performing paper feed from an inserter controlled by another connected printing apparatus, if the information acquired in the acquisition step indicates that a sheet to be used in printing is stored in a manual insertion paper feed unit.

According to another aspect of the present invention, there is provided a computer-readable medium storing a program which, in a printing system in which a paper feed unit of a second printing apparatus is connected to a paper discharge unit of a first printing apparatus, a sheet conveyed from the paper discharge unit of the first printing apparatus is fed to the paper feed unit of the second printing apparatus, and the second printing apparatus performs printing on the sheet, the first printing apparatus further comprising an inserter which is connected to the paper feed unit of the second printing apparatus, and feeds a held sheet to one of the first printing apparatus and the second printing apparatus, causes the first printing apparatus to function as a first control unit which controls paper feed from the inserter to the paper feed unit of the second printing apparatus, and causes the second printing apparatus to function as a second control unit which transmits, to the first control unit, control information for controlling paper feed from the inserter, wherein the second control unit determines whether a received print job contains an instruction designating manual insertion paper feed, and, if it is determined that the received print job contains an instruction designating manual insertion paper feed, transmits, to the first control unit, the control information requesting paper feed from the inserter.

In tandem-connected printing apparatuses, the present invention can provide a substitute method for a manual insertion paper feed unit of a rear printing apparatus without changing the arrangement of the printing apparatus main body, by feeding a printing medium having a large grammage from an inserter as a post-processing apparatus of a front printing apparatus.

Further features of the present invention will become apparent from the following description of exemplary embodiments (with reference to the attached drawings).

DESCRIPTION OF THE EMBODIMENTS

System Configuration

Figure 1:
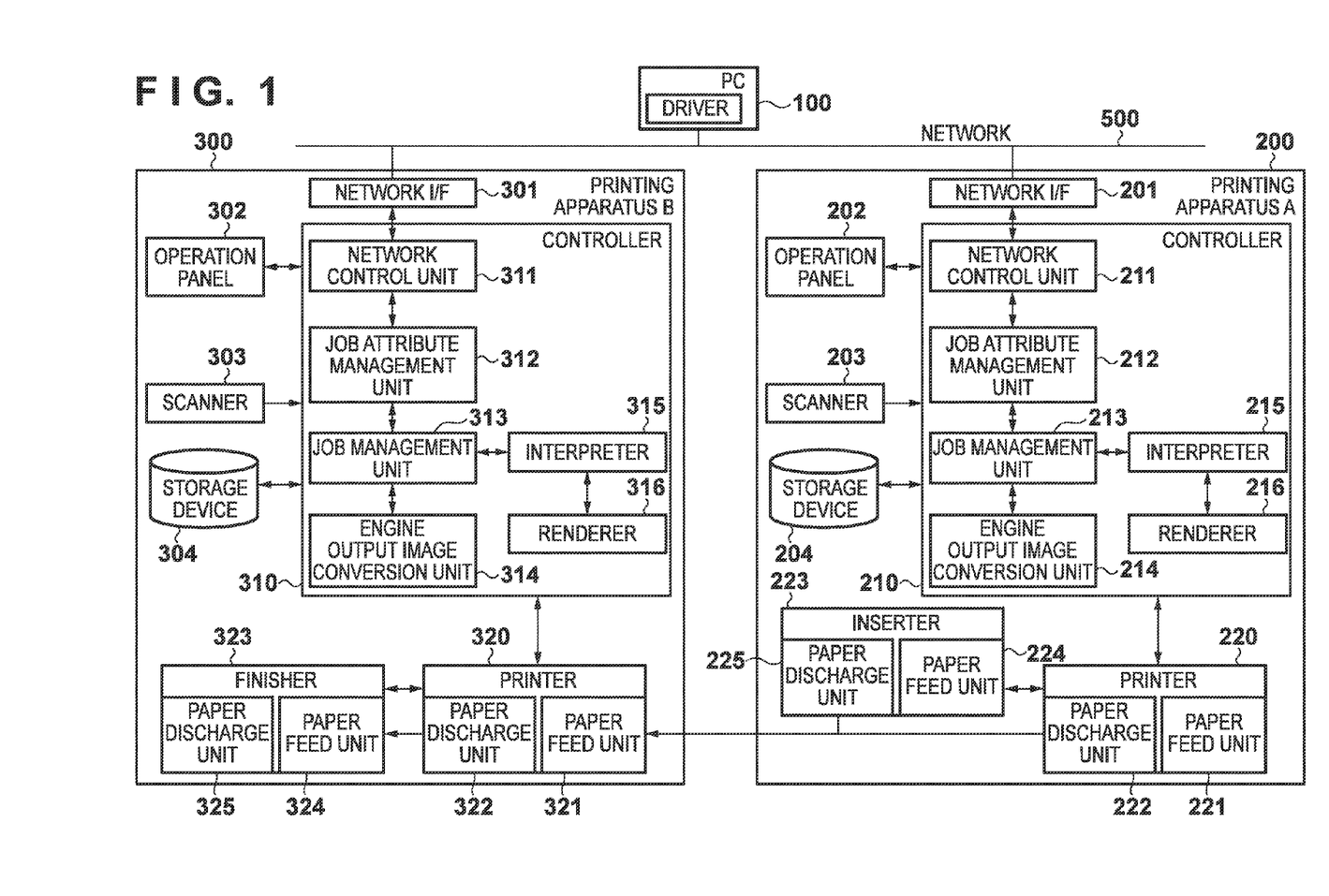
FIG. 1 is a view showing an example of a printing apparatus including tandem-connected printing apparatuses.

A mode for carrying out the present invention will be explained below with reference to the accompanying drawings. FIG. 1 is a view showing an example of a printing system including tandem-connected printing apparatuses according to this embodiment. As shown in FIG. 1, this printing system includes two tandem-connected printing apparatuses (a printing apparatus A 200 and printing apparatus B 300). Note that when performing a printing process by using both of the two tandem-connected printing apparatuses, the printing apparatus positioned on the upstream side (the printing apparatus A 200) will also be referred to as a first printing apparatus, and the printing apparatus positioned on the downstream side (the printing apparatus B 300) will also be referred to as a second printing apparatus. Note also that the two printing apparatuses are tandem-connected in this embodiment, but it is of course also possible to tandem-connect three or more printing apparatuses. In this case, each printing apparatus desirably includes an inserter except for the printing apparatus positioned on the most downstream side.

In the printing system shown in FIG. 1, a PC 100 for inputting print job data such as PDL to a printing apparatus is connected to the printing apparatus A 200 (the first printing apparatus) and the printing apparatus B 300 (the second printing apparatus) across a network 500.

A paper discharge unit 222 of the printing apparatus A 200 and a paper feed unit 321 of the printing apparatus B 300 are physically connected. Accordingly, a printed product generated by the printing apparatus A 200 and discharged from the paper discharge unit 222 can be fed to the printing apparatus B 300 from the paper feed unit 321.

A paper discharge unit 225 of the printing apparatus A 200 and the paper feed unit 321 of the printing apparatus B 300 are also physically connected. Therefore, a printed product generated by the printing apparatus A 200 and discharged from the paper discharge unit 225 can be fed to the printing apparatus B 300 from the paper feed unit 321.

In this embodiment, printing apparatuses of the same kind are used as the printing apparatus A 200 and printing apparatus B 300. Therefore, functional blocks 201 to 222 of the printing apparatus A 200 and functional blocks 301 to 322 of the printing apparatus B 300 are identical. Although the printing apparatus A 200 and printing apparatus B 300 can of course be printing apparatuses of different kinds, an explanation of the embodiment will be omitted. Furthermore, the printing apparatus A 200 and printing apparatus B 300 may have different printing functions.

Each functional block of the printing apparatuses used in this embodiment will be explained below. Network I/Fs 201 and 301 are interfaces for exchanging data with various information apparatuses across the network 500. In this embodiment, the network I/Fs 201 and 301 are used to receive print job data from the PC 100. Controllers 210 and 310 are used to exchange processing information in order for the printing apparatus A 200 and printing apparatus B 300 to perform a tandem printing process. Network control units 211 and 311 control the network I/Fs 201 and 301.

Operation panels 202 and 302 each include an operation unit for accepting operations input by the user, and a display unit for displaying printing apparatus information to the user. The operation panels 202 and 302 are electrically connected to the controllers 210 and 310. Operations input from the operation panels 202 and 302 by the user are transmitted to the controllers 210 and 310. Information is displayed on the operation panels 202 and 302 based on display instructions from the controllers 210 and 310.

Scanners 203 and 303 are each used to input, to the printing apparatus, print data as an object of a print job in the form of a paper medium. The scanners 203 and 303 optically read originals, and transmit digital image signals to the controllers 210 and 310.

Storage devices 204 and 304 store programs for controlling processes performed by the controllers 210 and 310 of the printing apparatuses. The storage devices 204 and 304 are also used as storage units for spooling, either temporarily or for a long term, print job data received from the network 500 by the printing apparatuses and print data read by the scanners 203 and 303. Furthermore, the storage devices 204 and 304 are used as temporary data storage units for storing image data formed by renderers 216 and 316 until printing processes start.

The controllers 210 and 310 are programs for controlling the hardware and interfaces of the printing apparatuses, and executed on CPUs (not shown) of the printing apparatuses. The controller 210 includes the functional blocks 211 to 216, and the controller 310 includes functional blocks 311 to 316. Note that the controller 210 of the printing apparatus A 200 will also be called a first control unit, and the controller 310 of the printing apparatus B 300 will also be called a second control unit.

The network control units 211 and 311 are processing blocks for controlling the network I/Fs 201 and 301. The network control units 211 and 311 transfer data received via the network I/Fs 201 and 301 to job attribute management units 212 and 312. Similarly, the network control units 211 and 311 transfer various data received together with addresses from the job attribute management units 212 and 312 to information apparatuses at the addresses via the network I/Fs 201 and 301.

The job attribute management units 212 and 312 determine whether data received across the network 500 is print job data or another information. If the received data is print job data, the job attribute management units 212 and 312 analyze the print job attribute of the print job data, transmit the analyzed contents to job management units 213 and 313, and store the received print job data in the storage devices 204 and 304. If the received data is another information, the job attribute management units 212 and 312 transmit the received data to the job management units 213 and 313. "Another information" herein mentioned is, for example, processing information to be exchanged between the controllers of the two printing apparatuses when they perform a tandem printing process in cooperation with each other, and includes information for controlling an inserter 223 and information pertaining to the state of the inserter 223. In response to instructions from the job management units 213 and 313, the job attribute management units 212 and 312 perform the process of rewriting the print job attributes of print job data stored in the storage devices 204 and 304. Also, to transfer print job data to another information apparatus, the job attribute management units 212 and 312 transmit various data together with addresses to the network control units 211 and 311.

The job management units 213 and 313 receive print job data from the job attribute management units 212 and 312. To smoothly perform print job processing based on the received print job data, the job management units 213 and 313 instruct interpreters 215 and 315 to form images based on drawing information stored in the storage devices 204 and 304. Then, the job management units 213 and 313 instruct engine output image conversion units 214 and 314 to convert the formed images into engine output images. The job management units 213 and 313 receive information of a printing medium and print job attributes such as a single-sided/double-sided printing instruction from the job attribute management units 212 and 312, and receive image processing information from the interpreters 215 and 315 and engine output image conversion units 214 and 314. Based on the received data, the job management units 213 and 313 determine information such as the conveying speeds of the printer engines and the fixing temperatures, thereby totally determining the printing process.

In accordance with instructions from the job management units 213 and 313, the interpreters 215 and 315 read out the drawing information from the storage devices 204 and 304, analyze the readout information, and cause the renderers 216 and 316 to perform a rendering process, thereby forming image data. The formed image data are stored in memories (not shown) or the storage devices 204 and 304.

In accordance with instructions from the job management units 213 and 313, the engine output image conversion units 214 and 314 read out the image data formed by the renderers 216 and 316 from the memories (not shown) or the storage devices 204 and 304. The engine output image conversion units 214 and 314 perform an image conversion process for printing such as a pseudo tone expressing process on the readout image data. Then, the engine output image conversion units 214 and 314 convert the generated engine output image data for printing into video signals, and transmit the signals to printers 220 and 320.

Based on paper feed instructions from the controllers 210 and 310, the printers 220 and 320 feed printing media from a paper feed unit 221 and the paper feed unit 321. The printers 220 and 320 perform appropriate developing processes on the printing media in accordance with the video signals received from the engine output image conversion units 214 and 314, and discharge the printed products to the paper discharge unit 222 and a paper discharge unit 322. The configuration explained up to this point is common to the printing apparatus A 200 and printing apparatus B 300 according to this embodiment.

The inserter 223 of the printing apparatus A 200 and a finisher 323 of the printing apparatus B 300 will be described below.

The inserter 223 of the printing apparatus A 200 receives a paper feed instruction from the controller 210 via the printer 220. Based on this paper feed instruction from the controller 210, the inserter 223 feeds a printing medium from a paper feed unit 224, and discharges the printing medium to the paper discharge unit 225, thereby inserting the printing medium into a predetermined page of a printed product discharged from the paper discharge unit 222 of the printer 220.

The finisher 323 of the printing apparatus B 300 has functions such as sorting and stapling. A paper discharge unit 322 of the printer 320 and a paper feed unit 324 of the finisher 323 are physically connected, and a finishing process instruction is received from the controller 310 via the printer 320. The finisher 323 performs a finishing process designated by the user, such as sorting or stapling, on a printed product discharged from the paper discharge unit 322 of the printer 320, and discharges the printed product by using a paper discharge unit 325.

[Procedure of Tandem Printing]

An outline of the procedure of tandem printing according to this embodiment is as follows. The printing apparatus A 200 feeds a printing sheet as a printing medium from the paper feed unit 221, performs a printing process on the sheet, and discharges the printed product to the paper discharge unit 222. The printing apparatus A 200 conveys the printed product to the paper feed unit 321 of the printing apparatus B 300. The printing apparatus B 300 feeds the printed product from the paper feed unit 321, performs a printing process on the printed product, and discharges the printed product to the paper discharge unit 322.

This tandem printing is implemented by the controller 210 of the printing apparatus A 200 and the controller 310 of the printing apparatus B 300 by closely exchanging information of image formation processes and printing processes pertaining to the same print job across the network 500. The first embodiment will be explained below based on the above-mentioned configuration.

First Embodiment

In the first embodiment, the PC 100 transmits a print job to the rear printing apparatus B 300. The printing apparatus B 300 performs an image formation process and printing process in accordance with the print job received from the PC 100. The printing apparatus B 300 forms a color image printed by using CMYK toner as general color toner, and a transparent image printed by using transparent toner. "Transparent toner" herein mentioned is a transparent recording material having the feature that it adds a transparent image to a printed product. A region printed by using this transparent toner alone forms an image that is not easy to see for a human. The effect of using the transparent toner is the ability to express, on a printed product, gloss or luster different from that of printing performed using only color toner. This makes it possible to perform printing by adding the expression of gloss by an image (transparent image) printed by using the transparent toner on an image (color image) printed by using the color toner.

Printing Example

Figure 2A:
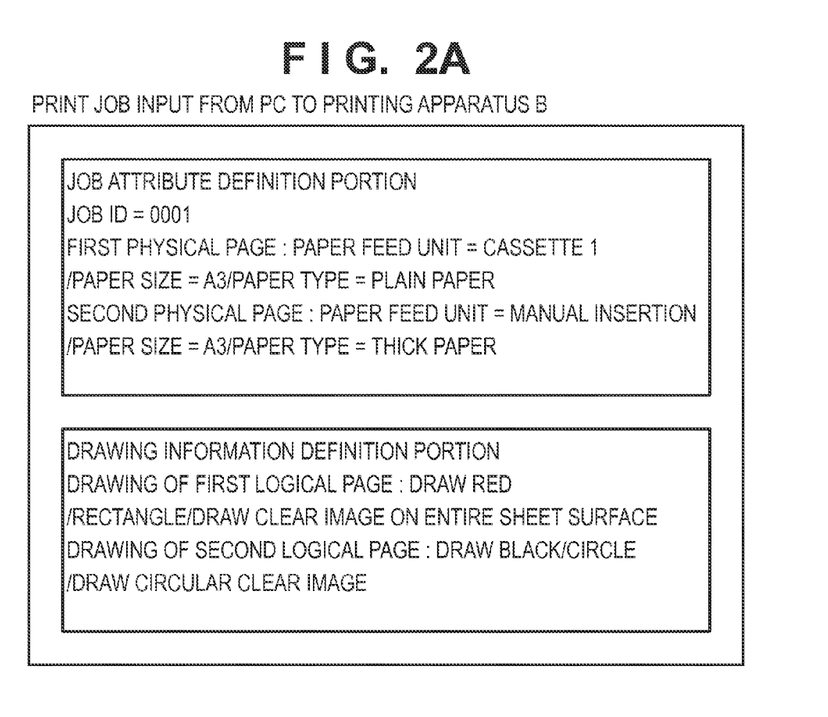
FIGS. 2A and 2B are views showing examples of the contents of a print job and an outline of printing results according to the first embodiment.
Figure 2B:
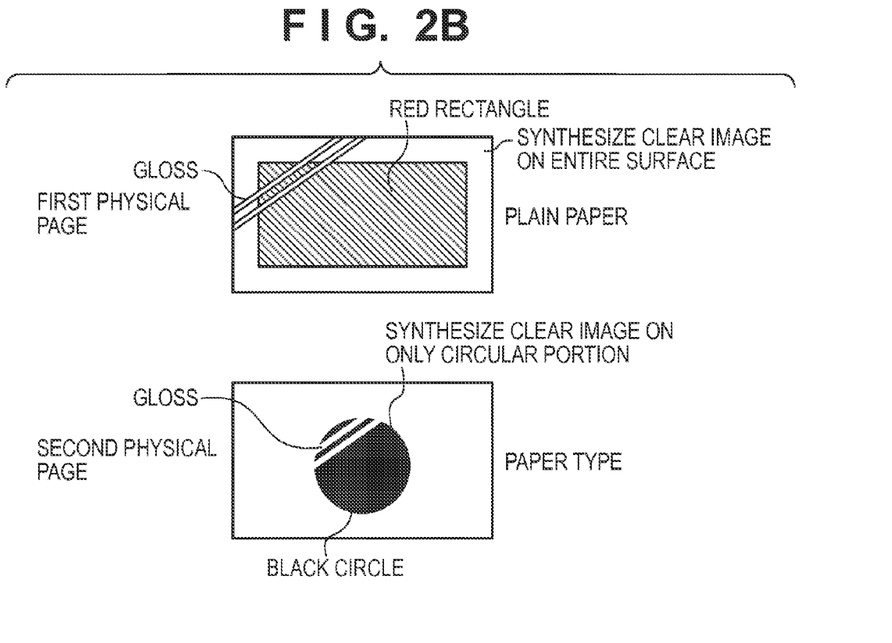

FIGS. 2A and 2B show examples of the contents of a print job and printing results. FIG. 2A shows an example of a print job input from the PC 100 to the printing apparatus B 300. As shown in FIG. 2A, the following information is described in a job attribute definition portion of this print job. First, "job ID" as information indicating an ID unique to the job is described. The job ID is used to find the same job when tandem-connected printing apparatuses perform processing in cooperation with each other. That is, the job ID is used to uniquely specify each print job.

Then, information indicating that an A3/plain paper sheet is to be fed from cassette 1 as a printing medium for the first physical page is defined. Likewise, information indicating that an A3/thick paper sheet is to be fed from a manual insertion paper feed unit as a printing medium for the second physical page is described. A physical page indicates the page of a printing medium as a visible image formation target. On the other hand, an image of a logical page is visualized by performing development on a physical page by using toner by the printer 320 of the printing apparatus B 300. It is possible to arrange one logical page for one physical page, and a plurality of logical pages for one physical page by using a reduced layout. It is also possible to arrange a logical page on each of the obverse and reverse surfaces of a physical page.

In this print job shown in FIG. 2A, a drawing information definition portion defines instructions to draw a red rectangle in the first logical page and draw a transparent image on the entire surface of the first logical page. The drawing information definition portion also stores instructions to draw a black circle and a circular transparent image having the same size as that of the black circle in the second logical page.

[Procedure]

Figure 3:
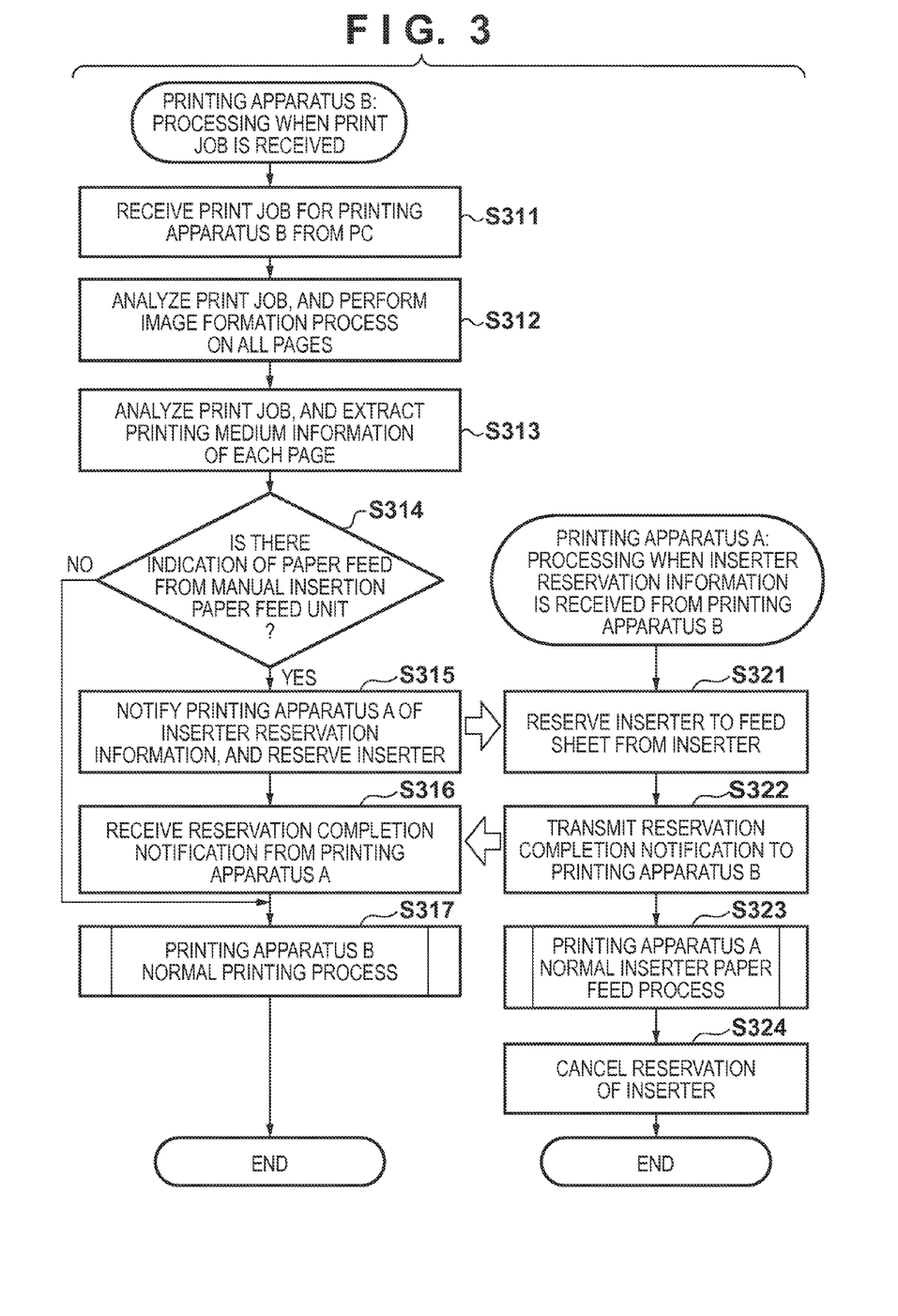
FIG. 3 is a view showing a procedure when executing the print job according to the first embodiment.

FIG. 3 is a view showing an example of a procedure when the printing apparatus B 300 has received a print job from the PC 100. Referring to FIG. 3, S311 to S317 indicate processing in the printing apparatus B 300, and S321 to S324 indicate processing in the printing apparatus A 200.

First, in S311, the printing apparatus B 300 receives the print job shown in FIG. 2A from the PC 100 via the network I/F 301, and the job attribute management unit 312 spools the received print job in the storage device 304. Note that the method by which the printing apparatus B 300 receives (inputs) a print job is not limited to this. For example, a print job held by a third printing apparatus (not shown) may be input to the printing apparatus B 300. It is also possible to download a print job from a server or another printing apparatus via an operation unit such as a WEB browser installed in the printing apparatus B 300.

In S312, the job management unit 313 extracts the information defined in the drawing information definition portion of the print job, and inputs the extracted information to the interpreter 315. The interpreter 315 analyzes the information of the drawing information definition portion, causes the renderer 316 to perform an image formation process, and stores image data of each formed logical page in a memory (not shown). In this embodiment, as defined in FIG. 2A, a red rectangular image and a clear full-page image are formed in the first logical page, and a black circular image and a clear circular image having the same size as that of the black circular image are formed in the second logical page. Then, the job management unit 313 reads out the image data of each logical page formed by the renderer 316 from the memory (not shown), and inputs the readout image data to the engine output image conversion unit 314. The engine output image conversion unit 314 converts the image data of each logical page into engine output image data so that each logical page is laid out in each physical page, and stores the converted data in the storage device 304.

In S313, the job attribute management unit 312 analyzes the information defined in the job attribute definition portion of the print job. Based on printing medium information (a paper feed unit, paper size, and paper type) of each page acquired by the analysis, the job management unit 313 determines the printing processes of all pages in the printing apparatus B 300. In this embodiment, A3/plain paper stored in cassette 1 is designated as a printing medium for the first physical page, and A3/thick paper stored in the manual insertion paper feed unit is designated as a printing medium for the second physical page.

In S314, the job management unit 313 determines whether the received print job is a print job for which a sheet is to be fed from the manual insertion paper feed unit. If it is determined that the received print job is a print job for which a sheet is to be fed from the manual insertion paper feed unit (YES in S314), the process advances to S315. If it is determined that the received print job is not a print job for which a sheet is to be fed from the manual insertion paper feed unit (NO in S314), the process advances to S317.

In S315, the job management unit 313 generates inserter reservation information as a preparation, and notifies the printing apparatus A 200 of this information via the network I/F 301 and network 500, thereby making a reservation for the inserter 223. The inserter reservation information herein generated is information to be used to notify the printing apparatus A 200 that the printing apparatus B 300 uses the inserter 223 of the printing apparatus A 200. The data structure of the inserter reservation information contains, for example, a job ID as a target, information of the user having designated the print job, and information of the printing apparatus B 300 as the transmission source. When the inserter 223 is reserved, the corresponding print job occupies the inserter 223. Also, the printing apparatus A 200 manages the inserter reservation information in accordance with the processing of the print job. Note that if the inserter 223 cannot be reserved even after the elapse of a predetermined time, notification (error notification) indicating this information may be performed.

In S321, the network I/F 201 of the printing apparatus A 200 receives the inserter reservation information transmitted from the printing apparatus B 300, and the job management unit 213 reserves the inserter 223.

In S322, in response to the inserter reservation information, the job management unit 213 of the printing apparatus A 200 notifies the printing apparatus B 300 that the reservation of the inserter 223 is complete, via the network I/F 201 and network 500.

In S316, the printing apparatus B 300 receives the notification indicating the completion of the reservation of the inserter 223 from the printing apparatus A 200 via the network I/F 301, and starts a normal printing process.

Figure 4:
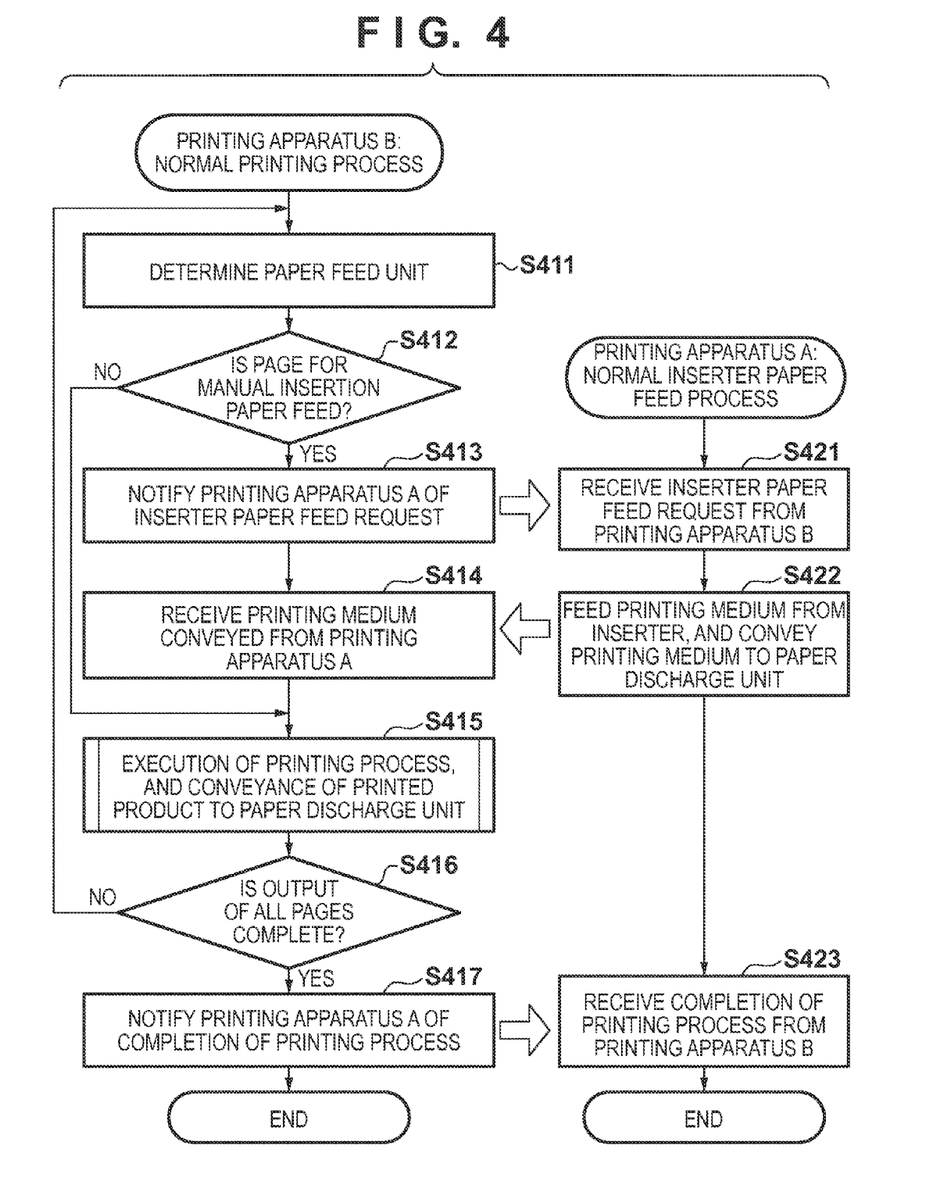
FIG. 4 is a view showing a procedure for performing a normal printing process according to the first embodiment.

In S317, the printing apparatus B 300 executes a normal printing process shown in FIG. 4. In response to this process, the printing apparatus A 200 executes a normal inserter paper feed process shown in FIG. 4 in S323. In the first embodiment, when the printing apparatus A 200 completes the normal inserter paper feed process shown in FIG. 4, the process advances to S324, and the job management unit 213 of the printing apparatus A 200 cancels the reservation of the inserter 223 performed in S321, and terminates the processing of the printing apparatus A 200. When the normal printing process in S317 is complete, the printing apparatus B 300 also terminates this procedure.

[Normal Printing Process]

FIG. 4 is a view showing an example of the procedure of the normal printing process performed by the printing apparatus B 300, and an example of the procedure of the normal inserter paper feed process performed by the printing apparatus A 200. These procedures correspond to S317 in the printing apparatus B 300 and S323 in the printing apparatus A 200 shown in FIG. 3. Referring to FIG. 4, S411 to S417 indicate processing in the printing apparatus B 300, and S421 to S423 indicate processing in the printing apparatus A 200.

First, in S411, the job management unit 313 of the printing apparatus B 300 determines a paper feed unit of a page to be printed, based on the printing medium information of each page acquired by the analysis in the job attribute management unit 312.

Then, in S412, the job management unit 313 determines whether the page to be printed is a page for which paper is to be fed from the manual insertion paper feed unit (not shown). If it is determined that the page to be printed is a page for which paper is to be fed from the manual insertion paper feed unit (YES in S412), the process advances to S413. If it is determined that the page to be printed is not a page for which paper is to be fed from the manual insertion paper feed unit (NO in S412), the process advances to S415.

In S413, the job management unit 313 generates an inserter paper feed request, and notifies the printing apparatus A 200 of this request via the network I/F 301 and network 500. The inserter paper feed request contains, as control information, the paper size and paper type of a printing medium designated as a sheet to be fed from the manual insertion paper feed unit of the printing apparatus B 300. Note that the information contained in the inserter paper feed request is not limited to this, and another information may be contained. The data structure is also not limited.

In S421, the network I/F 201 of the printing apparatus A 200 receives the inserter paper feed request from the printing apparatus B 300. The job management unit 213 of the printing apparatus A 200 instructs the inserter 223 to feed a printing medium matching the paper size and paper type requested by the inserter paper feed request.

In S422, the printing apparatus A 200 feeds the printing medium from the paper feed unit 224 of the inserter 223, and discharges the printing medium to the paper discharge unit 225. In S414, the paper feed unit 321 of the printing apparatus B 300 receives the printing medium conveyed from the printing apparatus A 200.

In S415, the engine output image conversion unit 314 of the printing apparatus B 300 reads out the engine output image data from the storage device 304, and transfers the readout data as a video signal to the printer 320. Based on the received video signal, the printer 320 executes a printing process on the printing medium, and discharges the printed product to the paper discharge unit 322.

In S416, the job management unit 313 determines whether the output of all pages is complete. If it is determined that the output of all pages is complete (YES in S416), the process advances to S417. If it is determined that the output of all pages is not complete (NO in S416), the process returns to S411.

In S417, the job management unit 313 notifies the printing apparatus A 200 of the completion of the printing process via the network I/F 301 and network 500. In S423, the network I/F 201 of the printing apparatus A 200 receives a printing process completion notification from the printing apparatus B 300. Thus, the procedures of the printing processes in the printing apparatus B 300 and printing apparatus A 200 are complete.

In the first embodiment, the print job shown in FIG. 2A is executed following the above-mentioned procedures, and the printing apparatus B 300 outputs the printed product shown in FIG. 2B. That is, a red rectangle is printed in the first physical page, the entire sheet is coated with transparent toner, a black circle is printed in the second physical page, and this circular portion alone is coated with the transparent toner. The portion coated with the transparent toner has gloss.

Note that color toner CMYK is used in the printing apparatus B 300, but the present invention is not limited to this, and it is also possible to use color toner as another color recording material. Likewise, transparent toner as a transparent recording material is used in the printing apparatus B 300, but the present invention is not limited to this, and spot color toner containing gold, silver, or the like may also be used.

[Exceptional Processing (when Paper is Out)]

Figure 5:
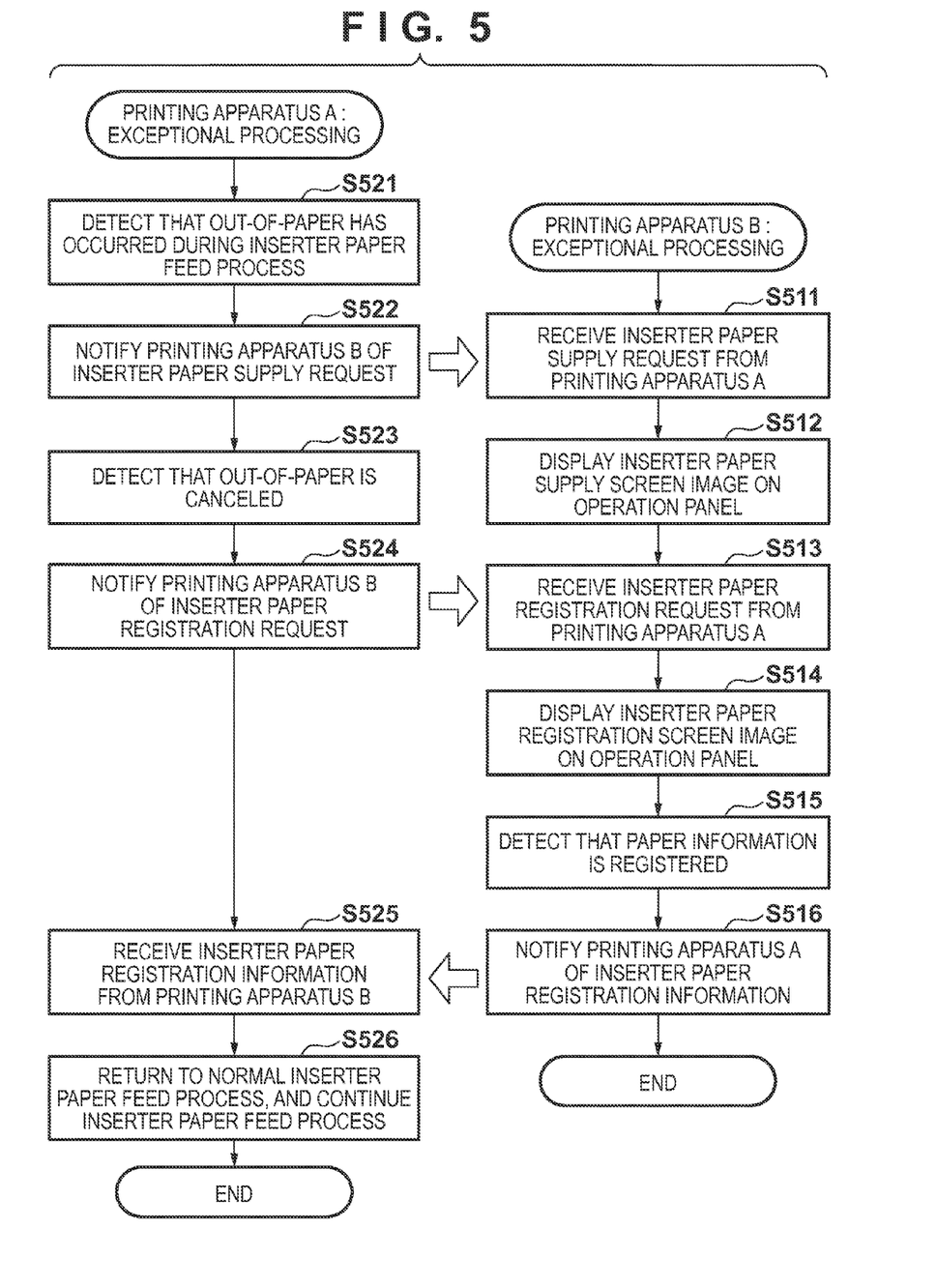
FIG. 5 is a view showing en exceptional procedure when out-of-paper occurs in an inserter according to the first embodiment.

Next, processing when out-of-paper occurs during the inserter paper feed process will be described below. FIG. 5 is a view showing an example of the procedure of exceptional processing performed by the printing apparatus A 200 and printing apparatus B 300 in cooperation with each other when out-of-paper occurs in the inserter 223. Referring to FIG. 5, S511 to S516 indicate processing in the printing apparatus B 300, and S521 to S526 indicate processing in the printing apparatus A 200.

First, in S521, the job management unit 213 of the printing apparatus A 200 detects that out-of-paper has occurred during the inserter paper feed process. This processing assumes that out-of-paper is detected during the process in S421 of FIG. 4. In S522, the job management unit 213 generates an inserter paper supply request based on the paper size and paper type, and notifies the printing apparatus B 300 of the request via the network I/F 201 and network 500. The data configuration of the inserter paper supply request herein notified is not particularly limited. When the printing apparatus B 300 is notified of out-of-paper, the display unit of the printing apparatus A 200 may also be controlled to display a message indicating out-of-paper.

Figure 6A:
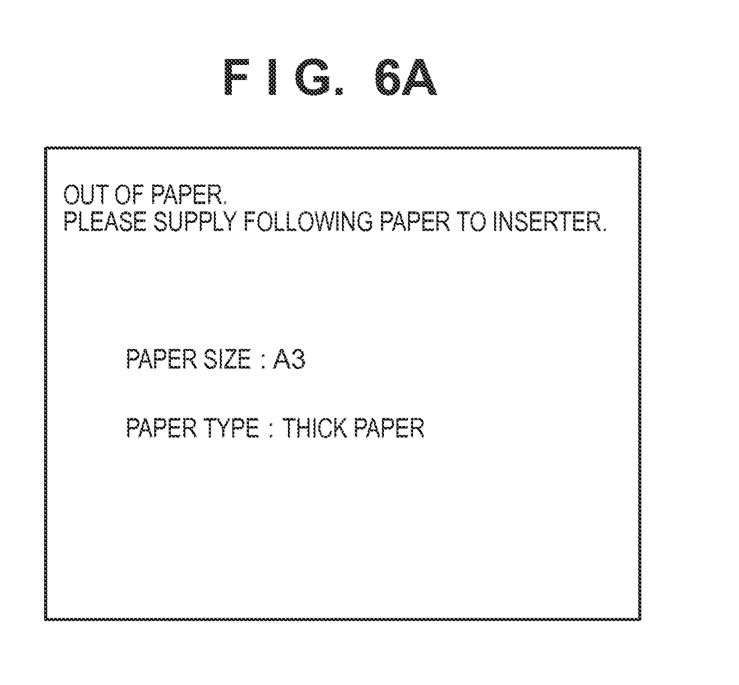
FIGS. 6A and 6B are views showing examples of a UI in printing apparatus B according to this embodiment.

In S511, the network I/F 301 of the printing apparatus B 300 receives the inserter paper supply request transmitted from the printing apparatus A 200. In S512, the job management unit 313 of the printing apparatus B 300 displays an inserter paper supply screen image shown in FIG. 6A on the operation panel 302, based on the paper size and paper type contained in the inserter paper supply request. Note that the display for prompting the user to supply sheets is not limited to the one shown in FIG. 6A.

When sheets are supplied to the inserter 223 by a recovery operation (paper supply) by the user after that, the job management unit 213 of the printing apparatus A 200 detects in S523 that out-of-paper of the inserter 223 is canceled. In S524, the job management unit 213 generates an inserter paper registration request, and notifies the printing apparatus B 300 of the request via the network I/F 201 and network 500. The inserter paper registration request herein notified may also be transmitted in response to, for example, the inserter paper supply request notified in S522.

In S513, the network I/F 301 of the printing apparatus B 300 receives the inserter paper registration request transmitted from the printing apparatus A 200. In S514, the job management unit 313 of the printing apparatus B 300 displays an inserter paper registration screen image shown in FIG. 6B on the operation panel 302.

Figure 6B:
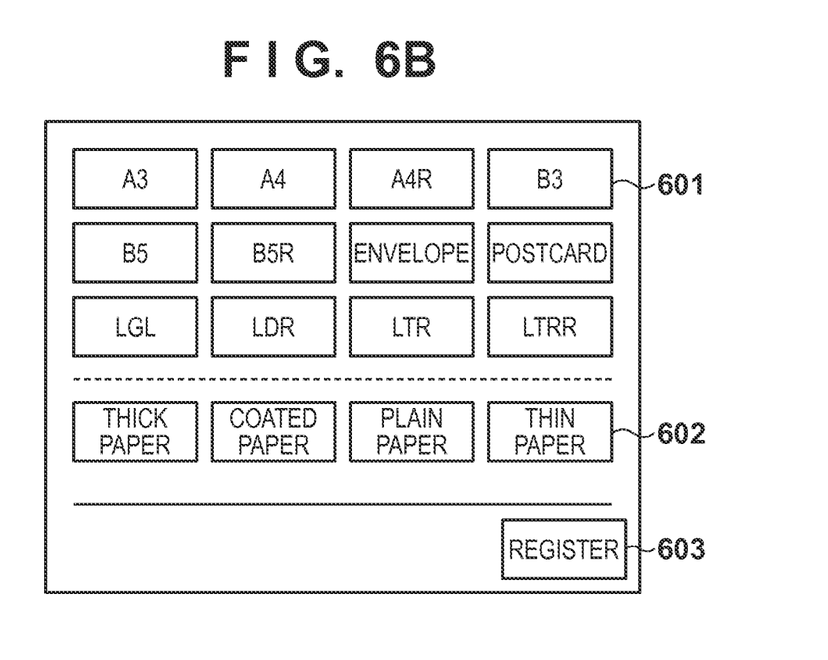

This inserter paper registration screen image is a screen image for prompting the user to register the paper size and paper type of sheets presently supplied to the inserter 223 of the printing apparatus A 200. Note that the inserter paper registration screen image shown in FIG. 6B is an example, and the present invention is not limited to this, so another arrangement may be used. In the screen image shown in FIG. 6B, the user selects a paper size from candidates indicated by buttons 601, and selects a paper type from candidates indicated by buttons 602. The user registers the size and type of the supplied sheets by pressing a registration button 603.

When the paper size and paper type are registered from the operation panel 302 by the user's operation via the inserter paper registration screen image, the job management unit 313 detects in S515 that the paper size and paper type are registered. In S516, the job management unit 313 generates inserter paper registration information based on the registered paper size and paper type, and notifies the printing apparatus A 200 of the information via the network I/F 301 and network 500. This inserter paper registration information may also be transmitted in response to, for example, the inserter paper registration request received in S513.

In S525, the network I/F 201 of the printing apparatus A 200 receives the inserter paper registration information from the printing apparatus B 300. In S526, the printing apparatus A 200 determines a sheet to be fed based on the received inserter paper registration information. Then, the procedure returns to the normal inserter paper feed process indicated by S421 to S423 in FIG. 4, thereby continuing the inserter paper feed process, and terminating this process.

This embodiment can perform the following processes. That is, the rear printing apparatus (the printing apparatus B 300) can execute the printing process by feeding a printing medium having a large grammage such as coated paper or thick paper from the inserter used as a post-processing apparatus of the front printing apparatus (the printing apparatus A 200). This obviates the need to modify a printing apparatus tandem-connected to a printing apparatus main body, and makes it possible to reduce the cost of the printing apparatus. Also, the user can generate a print job using various sheets without considering that the manual insertion paper feed unit of the rear printing apparatus is physically unusable, and this printing apparatus can process the job.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-282399, filed Dec. 17, 2010, which is hereby incorporated by reference herein in its entirety.

What is claimed is:

1. A printing system in which a paper feed unit of a second printing apparatus is connected to a paper discharge unit of a first printing apparatus, a sheet conveyed from the paper discharge unit of said first printing apparatus is fed to the paper feed unit of said second printing apparatus, and said second printing apparatus performs printing on the sheet, said first printing apparatus comprising:

a first paper feed unit configured to feed a held sheet to said first printing apparatus, an inserter configured to be further connected to the paper feed unit of said second printing apparatus, and to feed a held sheet to one of said first printing apparatus and said second printing apparatus, wherein the inserter is separate from the first paper feed unit, and a first control unit configured to control paper feed from said inserter to the paper feed unit of said second printing apparatus, and said second printing apparatus comprising a second control unit configured to transmit, to said first control unit, control information for controlling paper feed from said inserter, wherein said second control unit comprises:

a determination unit configured to determine whether an instruction designating manual insertion paper feed is contained in a received print job, and, a paper feed control unit configured to, in a case where the determination unit determines that the instruction designating manual insertion paper feed is contained in the received print job, transmit, to said first control unit, the control information requesting to feed a sheet held in said inserter from said inserter to the paper feed unit of said second printing apparatus, and in a case where the determination unit determines that the instruction designating manual insertion paper feed is not contained in the received print job, feed, to the paper feed unit of said second printing apparatus, a sheet which has been fed by the first paper feed unit and then undergone printing by said first printing apparatus.

2. The system according to claim 1, wherein said first control unit further transmits, to said second control unit, an inserter paper supply request indicating a paper supply request for said inserter, when detecting out-of-paper of said inserter, and said second control unit causes a display unit to display a screen image showing the paper supply request for said inserter, when receiving the inserter paper supply request.

3. The system according to claim 2, wherein aid first control unit further transmits, to said second control unit, an inserter paper registration request indicating a registration request for information of a sheet supplied to said inserter, when detecting that out-of-paper of said inserter is canceled, and said second control unit causes said display unit to display a screen image for prompting a user to register the information of the sheet supplied to said inserter, when receiving the inserter paper registration request, and transmits, to said first control unit, the information of the supplied sheet input by the user.

4. A printing method of a printing system in which a paper feed unit of a second printing apparatus is connected to a paper discharge unit of a first printing apparatus, a sheet conveyed from the paper discharge unit of the first printing apparatus is fed to the paper feed unit of the second printing apparatus, and the second printing apparatus performs printing on the sheet, the first printing apparatus comprising:

a first paper feed unit configured to feed a held sheet to the first printing apparatus, and an inserter configured to be further connected to the paper feed unit of the second printing apparatus, and to feed a held sheet to one of the first printing apparatus and the second printing apparatus, wherein the inserter is separate from the first paper feed unit, the method comprising:

a first control step of causing a first control unit to control paper feed from the inserter to the paper feed unit of the second printing apparatus, in the first printing apparatus; and a second control step of causing a second control unit to transmit, to the first control unit, control information for controlling paper feed from the inserter, in the second printing apparatus, wherein in the second control step, whether an instruction designating manual insertion paper feed is contained in a received print job is determined, in a case where it is determined that the instruction designating manual insertion paper feed is contained in the received print job, the control information requesting to feed a sheet held in the inserter from the inserter to the paper feed unit of the second printing apparatus is transmitted to the first control unit, and in a case where it is determined that the instruction designating manual insertion paper feed is not contained in the received print job, a sheet which has been fed by the first paper feed unit and then undergone printing by the first printing apparatus is fed to the paper feed unit of the second printing apparatus.

5. A non-transitory computer-readable medium storing a program which, in a printing system in which a paper feed unit of a second printing apparatus is connected to a paper discharge unit of a first printing apparatus, a sheet conveyed from the paper discharge unit of said first printing apparatus is fed to the paper feed unit of said second printing apparatus, and said second printing apparatus performs printing on the sheet, said first printing apparatus further comprising:

a first paper feed unit configured to feed a held sheet said first printing apparatus, and an inserter which is further connected to the paper feed unit of said second printing apparatus, and feeds a held sheet to one of said first printing apparatus and said second printing apparatus, wherein the inserter is separate from the first paper feed unit, causes said first printing apparatus to function as a first control unit which controls paper feed from said inserter to the paper feed unit of said second printing apparatus, and causes said second printing apparatus to function as a second control unit which transmits, to said first control unit, control information for controlling paper feed from said inserter, wherein said second control unit comprises:

a determination unit which determines whether an instruction designating manual insertion paper feed is contained in a received print job, and a paper feed control unit which, in a case where the determination unit determines that the instruction designating manual insertion paper feed is contained in the received print job, transmits, to said first control unit, the control information requesting to feed a sheet held in said inserter from said inserter to the paper feed unit of said second printing apparatus, and in a case where the determination unit determines that the instruction designating manual insertion paper feed is not contained in the received print job, feeds, to the paper feed unit of said second printing apparatus, a sheet which has been fed by the first paper feed unit and then undergone printing by said first printing apparatus.

* * * * *